(12) United States Patent
Nadiri et al.

(10) Patent No.: US 10,116,486 B2
(45) Date of Patent: Oct. 30, 2018

(54) APPARATUS AND METHODS FOR SIGNAL GENERATION, RECEPTION, AND SELF-CALIBRATION

(71) Applicant: VAYYAR IMAGING LTD., Yehud (IL)

(72) Inventors: Zivi Nadiri, Mishmar David (IL); Jonathan Rosenfeld, Ramat Hasharon (IL); Naftali Chayat, Kfar Saba (IL)

(73) Assignee: VAYYAR IMAGING LTD., Yehud (IL)

( * ) Notice: Subject to any disclaimer, the term of this patent is extended or adjusted under 35 U.S.C. 154(b) by 0 days.

(21) Appl. No.: 15/803,909

(22) Filed: Nov. 6, 2017

(65) Prior Publication Data

US 2018/0062906 A1 Mar. 1, 2018

Related U.S. Application Data

(63) Continuation of application No. 15/413,447, filed on Jan. 24, 2017, now Pat. No. 9,813,281, which is a continuation of application No. 14/859,397, filed on Sep. 21, 2015, now Pat. No. 9,553,621, which is a continuation of application No. 14/483,295, filed on Sep. 11, 2014, now Pat. No. 9,184,773.

(Continued)

(51) Int. Cl.
*H04L 27/36* (2006.01)
*H04L 27/38* (2006.01)

(52) U.S. Cl.
CPC ........... *H04L 27/367* (2013.01); *H04L 27/38* (2013.01); *H04L 27/3809* (2013.01)

(58) Field of Classification Search
CPC . H04L 27/3863; H04L 27/362; H04L 27/367; H04L 27/38; H04L 2027/0024; H04L 27/12; H03D 3/009; H03D 7/166; H03D 1/2245; H03D 3/008
See application file for complete search history.

(56) References Cited

U.S. PATENT DOCUMENTS 5,574,994 A   11/1996 Huang et al.
6,807,237 B1 * 10/2004 Yamaguchi ............. H04B 1/44
                                                        375/316

(Continued)

FOREIGN PATENT DOCUMENTS

KR      20100053835 A       5/2010
WO      WO 2004/062087 A1   7/2004
WO      WO 2009/143082      11/2009

OTHER PUBLICATIONS

International Search Report for PCT Application No. PCT/IL2014/050806 dated Dec. 23, 2014.

(Continued)

*Primary Examiner* — Curtis Odom
(74) *Attorney, Agent, or Firm* — Mark Cohen; Pearl Cohen; Zedek Latzer Baratz

(57) ABSTRACT

Apparatus and methods for signal generation, reception, and calibration involving quadrature modulation and frequency conversion. Embodiments of the present invention provide extremely wide bandwidth, high spectral purity, versatility and adaptability in configuration, and ease of calibration, and are particularly well-adapted for use in integrated circuitry.

11 Claims, 13 Drawing Sheets

Related U.S. Application Data

(60) Provisional application No. 61/876,949, filed on Sep. 12, 2013.

(56) References Cited

U.S. PATENT DOCUMENTS

| | | |
|---|---|---|
| 7,542,740 B1 | 6/2009 | Granger-Jones |
| 7,844,015 B2 | 11/2010 | Assouline |
| 7,856,048 B1 | 12/2010 | Smaini et al. |
| 8,200,181 B1 | 6/2012 | Khlat et al. |
| 8,599,965 B2 | 12/2013 | Kato et al. |
| 2002/0094036 A1 | 7/2002 | Jackson et al. |
| 2004/0125888 A1 | 7/2004 | Cho et al. |
| 2008/0144736 A1 | 6/2008 | Assouline |
| 2009/0052556 A1 | 2/2009 | Fernandez |
| 2009/0232260 A1 | 9/2009 | Hayashi |
| 2010/0273442 A1 | 10/2010 | Zeng et al. |
| 2012/0236802 A1 | 9/2012 | Gong |
| 2013/0223571 A1 | 8/2013 | Dark et al. |

OTHER PUBLICATIONS

Supplementary European Search Report for European Application No. 14844714.7 dated Oct. 10, 2016.

\* cited by examiner ered as embodiments of the present invention.

APPARATUS AND METHODS FOR SIGNAL GENERATION, RECEPTION, AND SELF-CALIBRATION

This is a Continuation of U.S. patent application Ser. No. 15/413,447 filed Jan. 24, 2017 now U.S. Pat. No. 9,813,281 issued Nov. 7, 2017 which is a Continuation of U.S. application Ser. No. 14/859,397 filed Sep. 21, 2015 now U.S. Pat. No. 9,553,621 issued Jan. 24, 2017 which is a Continuation of U.S. application Ser. No. 14/483,295 filed Sep. 11, 2014 now U.S. Pat. No. 9,184,773 issued Nov. 10, 2015 which claims benefit of U.S. Pat. No. 61/876,949 filed Sep. 12, 2013.

BACKGROUND

Generating broadband quadrature-modulated signals presents a number of challenges in achieving wide bandwidth and spectral purity, in shaping the waveform, in eliminating spurious components and non-linearities from the delivered signal, and in calibrating the quadrature modulation. Receiving and demodulating the signals presents similar challenges, particularly in cases of frequency conversion relating to image rejection and local oscillator (LO) leakage at the intermediate frequency (IF). Another issue involves quadrature imbalance at the local oscillator, where imbalances occurring at different points in the transmit/receive path are typically inseparable and are therefore not readily correctible. Thus, it would be desirable to have apparatus and methods for generating and receiving quadrature-modulated signals having not only wide bandwidth and spectral purity, but also featuring ease of calibration and rejection of undesirable artifacts in the signal. This goal is met by embodiments of the present invention.

SUMMARY

An embodiment of the present invention provides extremely wide-band signal-generating apparatus featuring multiple signal synthesizers and multiple quadrature modulators having independently-selectable configurations for flexible interconnections. Apparatus according to this embodiment allows convenient combination and isolation of different sections to enable convenient characterization of spectral components and filters for optimizing performance and rejection of spurious signal artifacts.

Another embodiment of the present invention provides quadrature modulators having internal digital filters to compensate for the frequency-dependencies of low-pass anti-aliasing filters.

A further embodiment of the present invention provides digital pre-processing apparatus for conditioning an input waveform to signal generation apparatus as disclosed herein.

Other embodiments of the present invention provide methods for self-calibration of analog and digital components of signal generating and receiving apparatus as disclosed herein.

Embodiments of the present invention are particularly well-suited to being incorporated within integrated circuits.

Further advantages offered by embodiments of the present invention include the ability for configurations to be adapted on the fly, and to be adaptively optimized according to the specific environment and operational settings. Embodiments of the present invention can thus be optimized in the various degrees of freedom (e.g. per frequency) for performance, spur rejection, interference resiliency, signal-to-noise ratio, bit error rate, and so forth.

It is understood that the present invention is not limited to the particular area of Radar and that embodiments of the invention are also applicable to other areas of the microwave signal field; including but not limited to: communications; radio frequency (RF) imaging; multiple input-multiple output (MIMO) communications and phased arrays; sensor-based applications (e.g. material analysis/monitoring); and test equipment implementation, such as vector network analyzers (VNA).

BRIEF DESCRIPTION OF THE DRAWINGS

The subject matter disclosed may best be understood by reference to the following detailed description when read with the accompanying drawings in which.

Figure 1A:
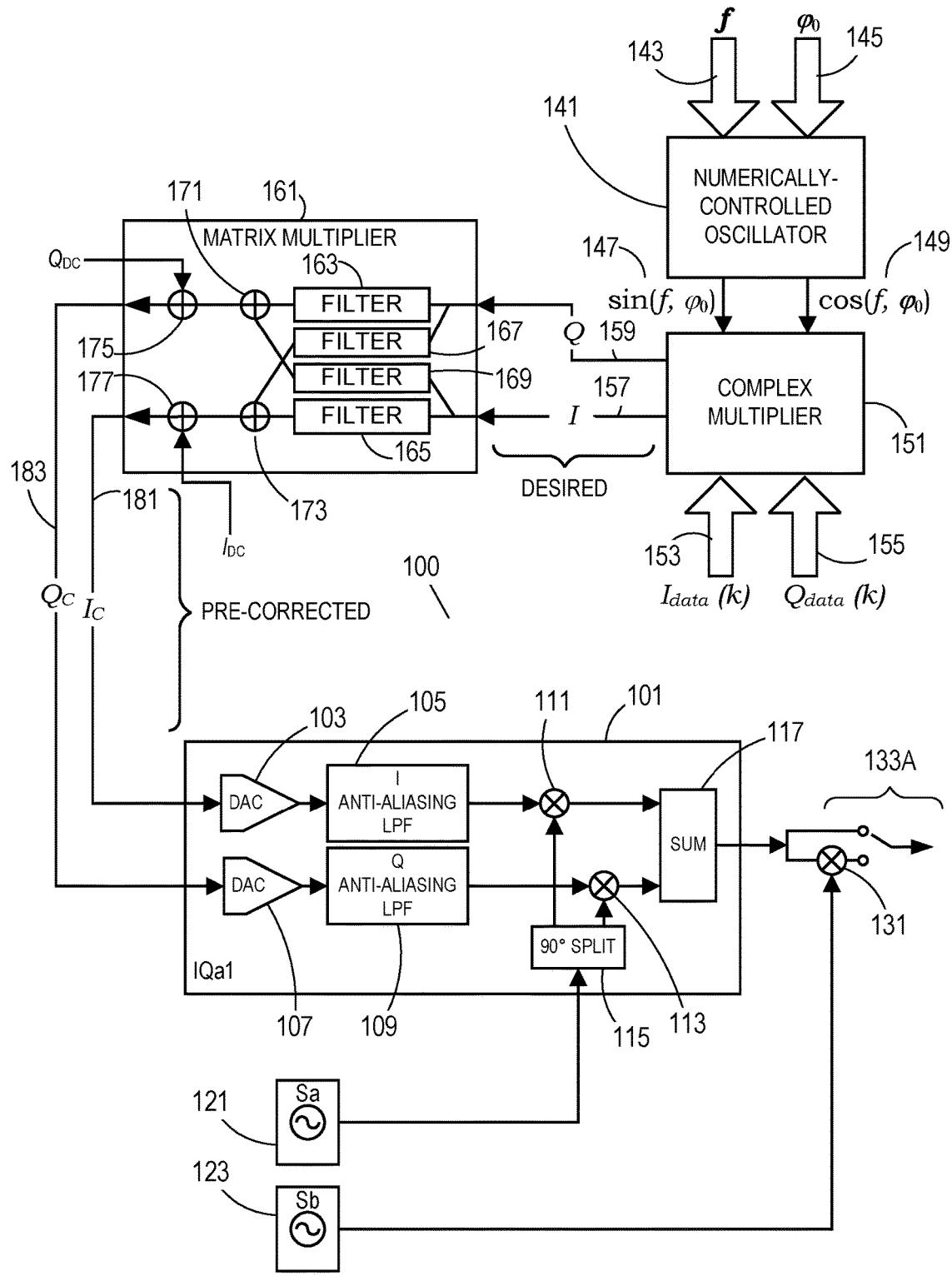
FIG. 1A illustrates a signal generator with pre-corrected digital inputs according to an embodiment of the present invention.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1A illustrates a signal generator 100 with pre-corrected digital inputs 181 and 183 according to an embodiment of the present invention.

In a quadrature modulation block 101, digital-to-analog converters (DAC) 103 and 107, respectively, receive digital inputs 181 and 183 and send analog signals corresponding thereto to anti-aliasing low-pass filters (LPF) 105 and 109, respectively. Digital input 181 is a pre-corrected in-phase input $I_C$, whereas digital input 183 is a pre-corrected quadrature input $Q_C$. Anti-aliasing low-pass filters 105 and 109 in turn output signals to multiplicative mixers ("mixers") 111 and 113, respectively. A 90° splitter 115 receives a synthesized frequency from a synthesizer 121 and outputs two signals which are 90° out of phase, with the signal to mixer 113 lagging 90° behind the signal to mixer 111. The mixed outputs from mixer 111 and mixer 113 are input to a summing unit 117.

The output from quadrature modulation block 101 is input to a switch 133A, which can be selectably switched to pass the direct output of quadrature modulation block 101 or the output of quadrature modulation block 101 mixed by a mixer 131 with a synthesized frequency from a synthesizer 123.

Various embodiments of the invention feature switches configured in a manner similar to that of switch 133A. Certain embodiments of the invention provide that these switches be independently selectably switchable. Independent switchability according to these embodiments of the invention not only provides versatility in configuring apparatus, but also provides benefits in calibration of the apparatus, as detailed below.

Quadrature modulation typically suffers from spurious image-frequency signal and from local oscillator feedthrough. These imperfections can be significantly reduced by signal pre-compensation in the digital domain. The setting of the pre-compensation or pre-correction coefficients requires a feedback mechanism allowing the measurement of the above spurious signals.

Therefore, an embodiment of the present invention provides for pre-correction as follows. A numerically-controlled oscillator (NCO) 141 receives a frequency signal 143 to set the frequency f of the oscillator, and an initial phase signal 143 to set the initial phase $\varphi_0$. Numerically-controlled oscillator 141 outputs two signals, a sine wave 147 $\sin(f, \varphi_0)$ and a cosine wave 149 $\cos(f, \varphi_0)$, which are input to a complex multiplier 151, whose other inputs are an in-phase data stream 153 $I_{data}(k)$ and a quadrature data stream 155 $Q_{data}(k)$. The complex product outputs of complex multiplier 151 are a desired in-phase data wave 157 I and a desired quadrature data wave 159 Q. However, in order to compensate for effects such as amplitude imbalance of quadrature modulation to be performed by quadrature modulation block 101, a pre-correction is needed, which is furnished by a matrix multiplier 161, containing filters 163, 165, 167 and 169 for single sideband (SSB) rejection. In addition, matrix multiplier 161 also corrects for local oscillator leakage with direct current offsets $I_{DC}$ and $Q_{DC}$ into summing mixers 177 and 175, respectively.

Furthermore, in accordance with an embodiment of the present invention, digital filters 163, 165, 167, and 169 feeding into summing mixers 171 and 173, respectively, are incorporated into matrix multiplier 161 to compensate for the frequency-dependencies of anti-aliasing low pass filters 105 and 109. The result, as previously noted, are pre-corrected in-phase input 181 $I_C$ and pre-corrected quadrature input 183 $Q_C$.

Figure 1B:
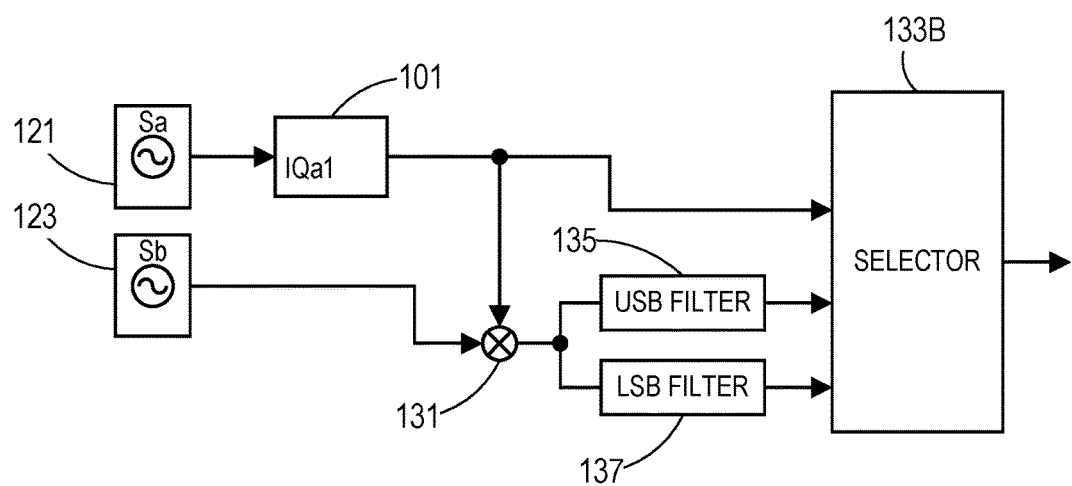
FIG. 1B illustrates a sideband selector switch for the signal generator of FIG. 1A, according to a related embodiment of the present invention.

FIG. 1B illustrates a sideband selector configuration switch 133B according to a related embodiment of the present invention. Sideband selector configuration switch 133B selectively switches between the direct output of quadrature modulation block 101 and either the upper sideband of the output of quadrature modulation block 101 mixed via mixer 131 with the output of synthesizer 123, or the lower sideband thereof, as passed by an upper sideband filter 135 or a lower sideband filter 137, respectively.

In the above descriptions, transmission signal generation is a hybrid configurable one/two conversion process as illustrated in FIG. 1A. The different states reached under the topology depend on the setting of switch 133A and are as follows:

Direct conversion based on a frequency synthesizer 121, which is directly modulated by wide-band quadrature modulator block 101;

Double conversion operation based on mixing between the output of quadrature modulator block 101 with synthesizer 123.

This architecture inherently features an extremely wide frequency coverage (DC to 10 s GHz) while maintaining low spurious signal content. In certain cases the synthesizer frequency range is increased by digital dividers. In these cases, for noise minimization and stability, it may be of interest to have the synthesizers operate at different frequencies. Digitally divided signals, however, typically have high spurious harmonic content. Operation over a multi-octave frequency range normally requires complicated re-configurable filters and filter banks to suppress these spurious signals. By heterodyne down-conversion of the direct modulated signal, wide frequency coverage can be achieved with the spurious signals lying out-of-band.

As the frequency coverage requirement widens, so does the coverage requirement from the synthesizers and direct modulators. Employing both direct and double conversions may relax the above requirement. For example, a quadrature modulator covering the range 4-8 GHz may be mixed with an additional 8-12 GHz synthesizer in order to cover the DC-4 GHz range, and with a 12-16 GHz synthesizer in order to cover the 8-12 GHz frequency range. Higher frequencies may be covered by using up-conversion rather than down-conversion.

Another benefit provided by embodiments of the present invention is the capability of arbitrarily modulating a wideband waveform (as wide as the baseband) at any frequency within the frequency coverage. This permits the use of modulation schemes such as chirp/pseudo-random bit sequence (PRBS) for pulse compression in radar applications, communication constellations, and so forth.

Further use of the arbitrary digital modulation provided by embodiments of the present invention allows a fine-frequency offset in the digital domain. This permits coarser frequency steps in the synthesizers, improving their phase noise performance for the same frequency resolution requirement.

Another benefit provided by embodiments of the present invention is the ability to reach a certain output frequency via several different configurations. In a non-limiting example, by stepping the synthesizer to a higher frequency and correspondingly stepping the baseband frequency to a lower frequency the output frequency is unchanged. This is instrumental in producing a coherent frequency coverage across all synthesizer frequencies, even though it does not retain a specific phase over frequency change.

Figure 2:
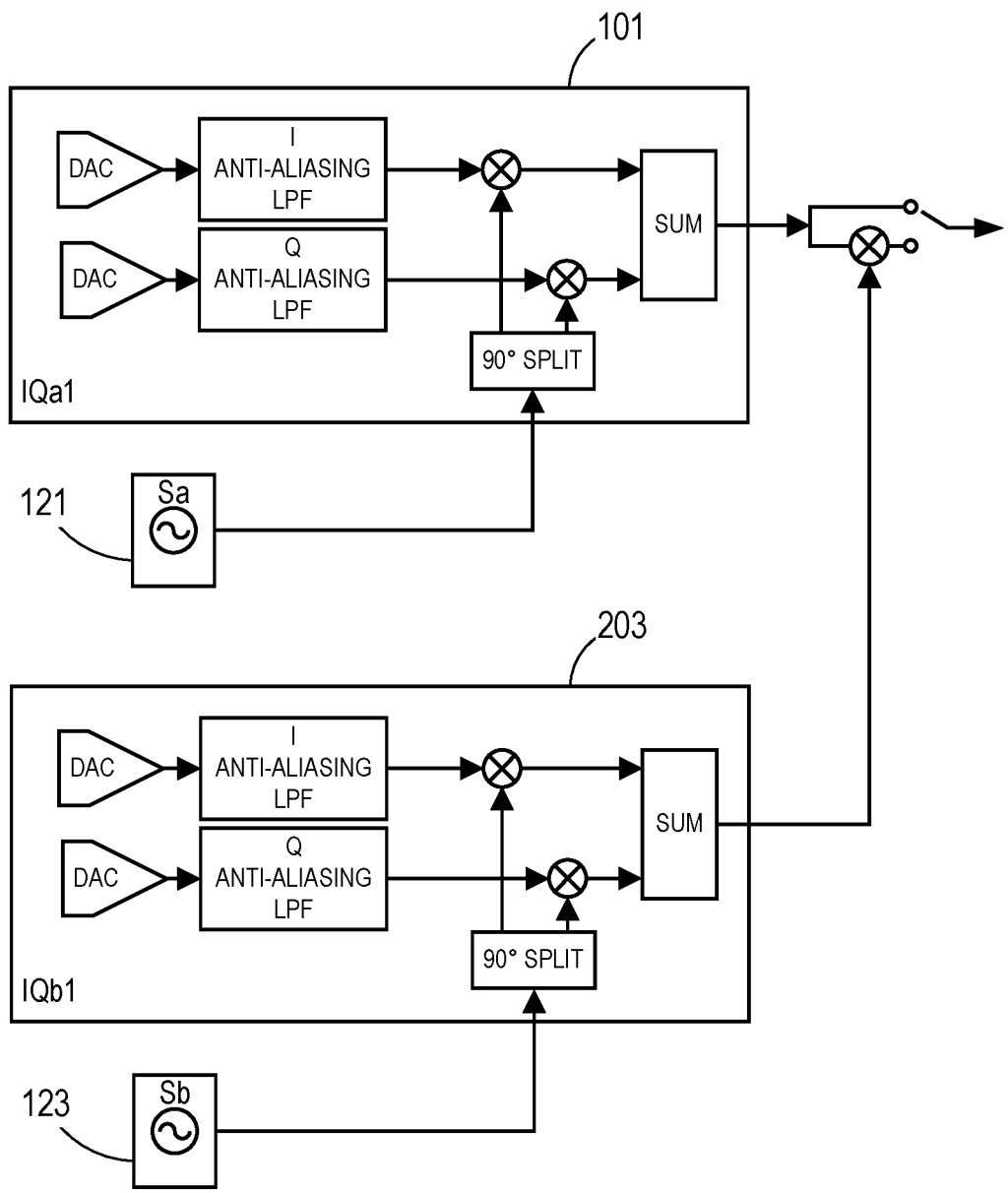
FIG. 2 illustrates a signal generator according to an embodiment of the present invention.

FIG. 2 illustrates a signal generator according to another embodiment of the present invention, where a second quadrature modulation block 203 is utilized to directly modulate synthesizer 123 to create the local oscillator for the second conversion. This enables a tradeoff of quadrature modulation imbalance versus phase noise to attain arbitrary frequency in generating the local oscillator for the conversion node.

Figure 3:
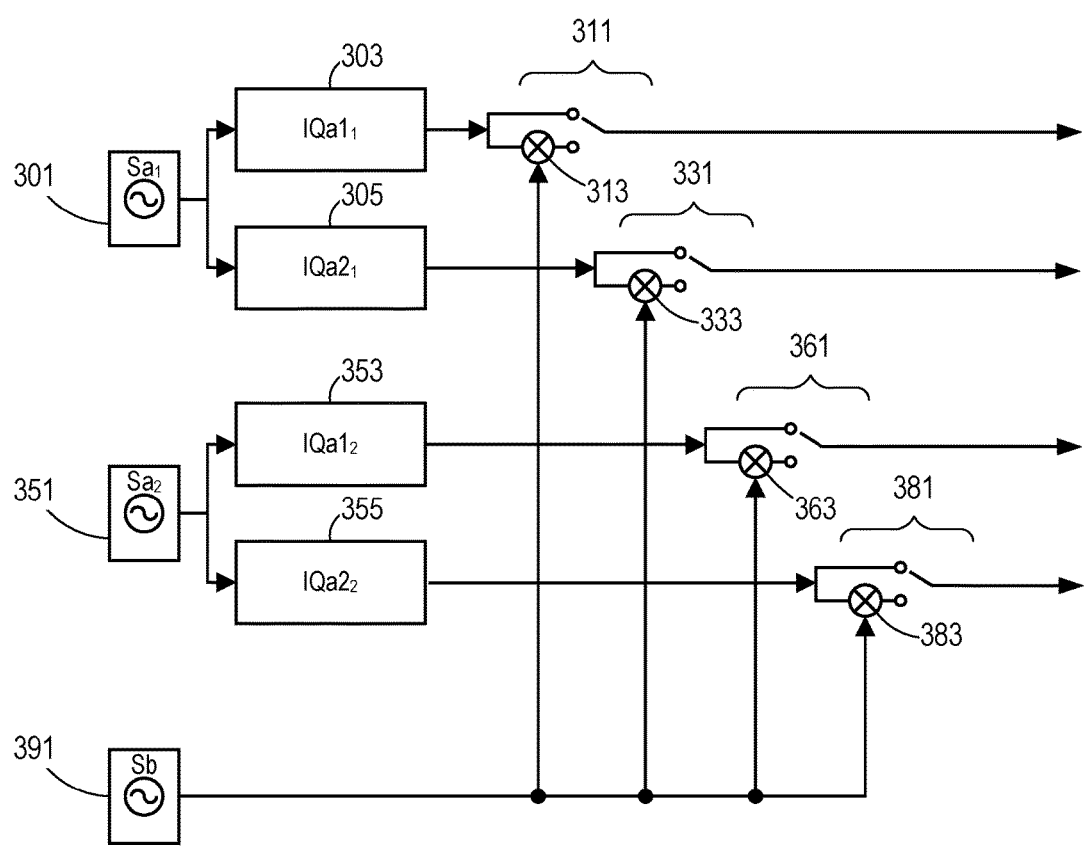
FIG. 3 illustrates a multiple signal generator according to an embodiment of the present invention.

FIG. 3 illustrates a multiple signal generator according to an embodiment of the present invention. Frequency synthesizer 301 feeds quadrature modulation blocks 303 and 305, and frequency synthesizer 351 feeds quadrature modulation blocks 353 and 355. Selector switches 311, 331, 361, and 381 operate as previously described for selector switch 133A (FIG. 1A), and selectably switch between the direct output of quadrature modulation blocks 303, 305, 353, and 355 respectively, and outputs of mixers 313, 333, 363, and 383, respectively, all of which receive input from frequency synthesizer 391.

As previously noted, various embodiments of the present invention provide selector switches 311, 331, 361, and 381 to be independently switchable.

The arrangement illustrated in FIG. 3 is useful in Radar communication systems where there is a need for multiple microwave signals in parallel. Non-limiting examples of such needs include:

Simultaneous generation of transmit signal and of a receive local oscillator signal;

Generation of multiple transmit signals in multiple input-multiple output (MIMO) and phased/true delay array systems; and Generation of sine and cosine local oscillator signals of quadrature down conversion.

Figure 4:
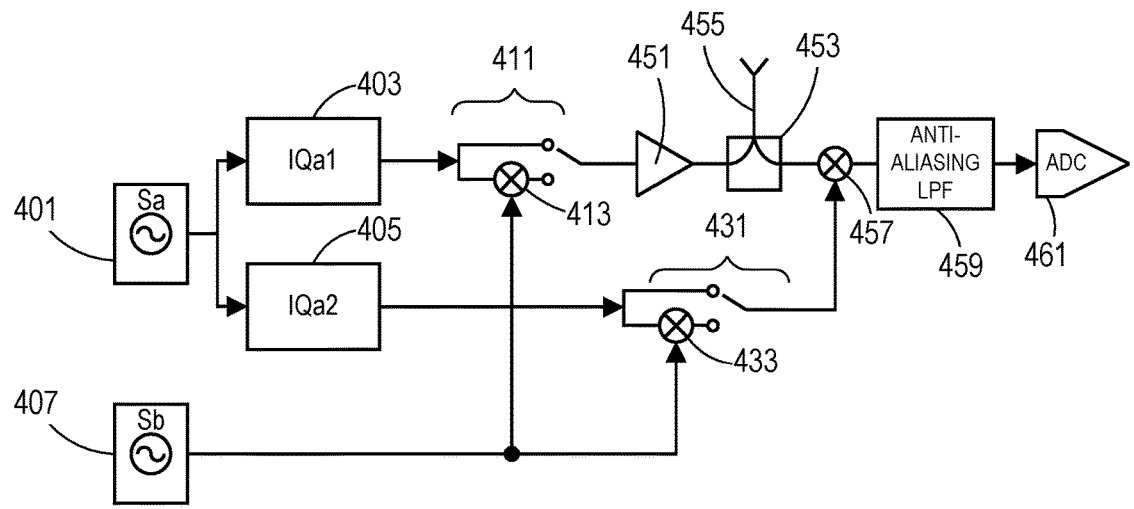
FIG. 4 illustrates a transceiver according to an embodiment of the present invention.

For example, by digitally modulating the transmit signal and the receive local oscillator signal in a short range frequency-modulated continuous wave (FM-CW) radar system one can introduce an intentional frequency offset so as to avoid handling near-DC signals (see FIG. 4). An inherent trait of this architecture is that several direct conversion blocks and heterodyne converters may be fed from the same synthesizers, thereby naturally meeting the aforementioned need. This allows phase tracking between different microwave signals, as well as tracking of the phase noise.

Another advantage of this architecture is the distribution of a generated signal among many nodes, such as transmission antennas/receivers etc. This enables applications such as "Multistatic Radar" (see below).

Further embodiments of the present invention provide multiple synthesizers (as in FIG. 3), some of which are modulated and some are not, so as to simultaneously generate multiple signals at arbitrarily spaced frequencies.

FIG. 4 illustrates a transceiver according to an embodiment of the present invention. A frequency synthesizer 401 feeds quadrature modulator blocks 403 and 405 having selector switches 411 and 431 respectively, which select between direct output from the quadrature modulator blocks and the outputs of mixers 413 and 433, respectively, both of which receive input from a frequency synthesizer 407. The output of selector switch 411 feeds into an amplifier 451, which in turn feeds an antenna switch/circulator 453 to an antenna 455 for transmission. Signals received from antenna 455 (such as by reflections of the transmitted signal) are fed to a mixer 457, which receives input from switch 431. Output of mixer 457 feeds to an anti-aliasing low-pass filter 459 and thence to an analog-to-digital converter 461 (ADC).

By modulating quadrature modulation blocks 403 and 405, fed by the same synthesizer 407 with a frequency shift, both the transmit signal and local oscillator drive for an arbitrary intermediate frequency (IF) receiver are produced. The received signal is down-converted to an intermediate frequency corresponding to the offset of the modulation frequency between quadrature modulation blocks 403 and 405.

Another example of arbitrary waveform modulation-based receiver local oscillator generation is a modulation with a pseudo-random binary sequence (PRBS) modulation, for a spread-spectrum radar.

A further example of an arbitrarily-configurable demodulation is multi-tone demodulating. Such a configuration is useful in the simultaneous measurement of several spectral components, e.g. by down-converting them to distinct intermediate frequencies. Both the amplitudes and phases of the spectral components may be measured.

The above capability of the signal generator for attaining an output frequency in several configurations, enables relating measurements across the entire frequency range, i.e. including local oscillator and measured path phase. According to a related embodiment, this is achieved by overlapping measurements between different local oscillator frequencies, where the baseband frequencies are adjusted to account for the local oscillator frequency offset between the measurements. This phase-related measurement differs from the common practice in the art, where, as the local oscillator is tuned over the coverage range, unaccounted-for phase changes occur. Retaining the relative phase according to this embodiment is instrumental in characterizing non-linear parameters in a vector network analyzer (VNA) embodiment of the present invention.

Figure 5:
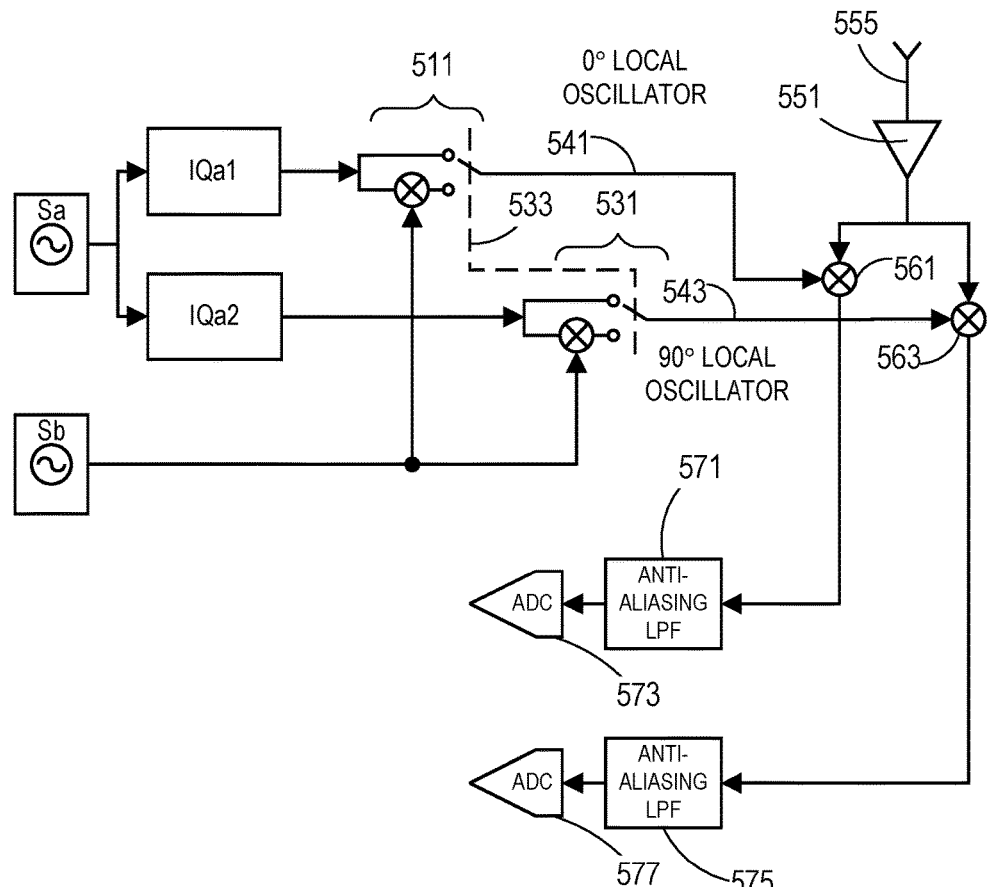
FIG. 5 illustrates a quadrature receiver according to an embodiment of the present invention.

FIG. 5 illustrates a quadrature receiver according to an embodiment of the present invention. A switch 511 and a switch 531 are ganged together by a common selector 533, to generate a 0° local oscillator 541 and a 90° local oscillator 543, which feed mixers 561 and 563, respectively, to convert a signal received by an antenna 555, which is amplified by an amplifier 551. The two intermediate frequency signals are fed into anti-aliasing low-pass filters 571 and 575, respectively, to be demodulated by analog-to-digital converters 573 and 577, respectively.

The configuration illustrated in FIG. 5 allows the generation of a 90° split over a wide frequency range, as opposed to conventional analog techniques, and without introducing substantial spurious harmonic content, which occurs when using digital dividers.

According to related embodiments of the invention, calibration techniques can be used to adjust the relative phase and amplitude between the quadrature channels. In non-limiting examples: measuring the phase and amplitude between the in-phase (I) and quadrature (Q) components of the down-converted continuous wave signal; simultaneously measuring the phase and amplitude on several signals; and cross-correlation measurements between the I and Q arms.

Figure 6:
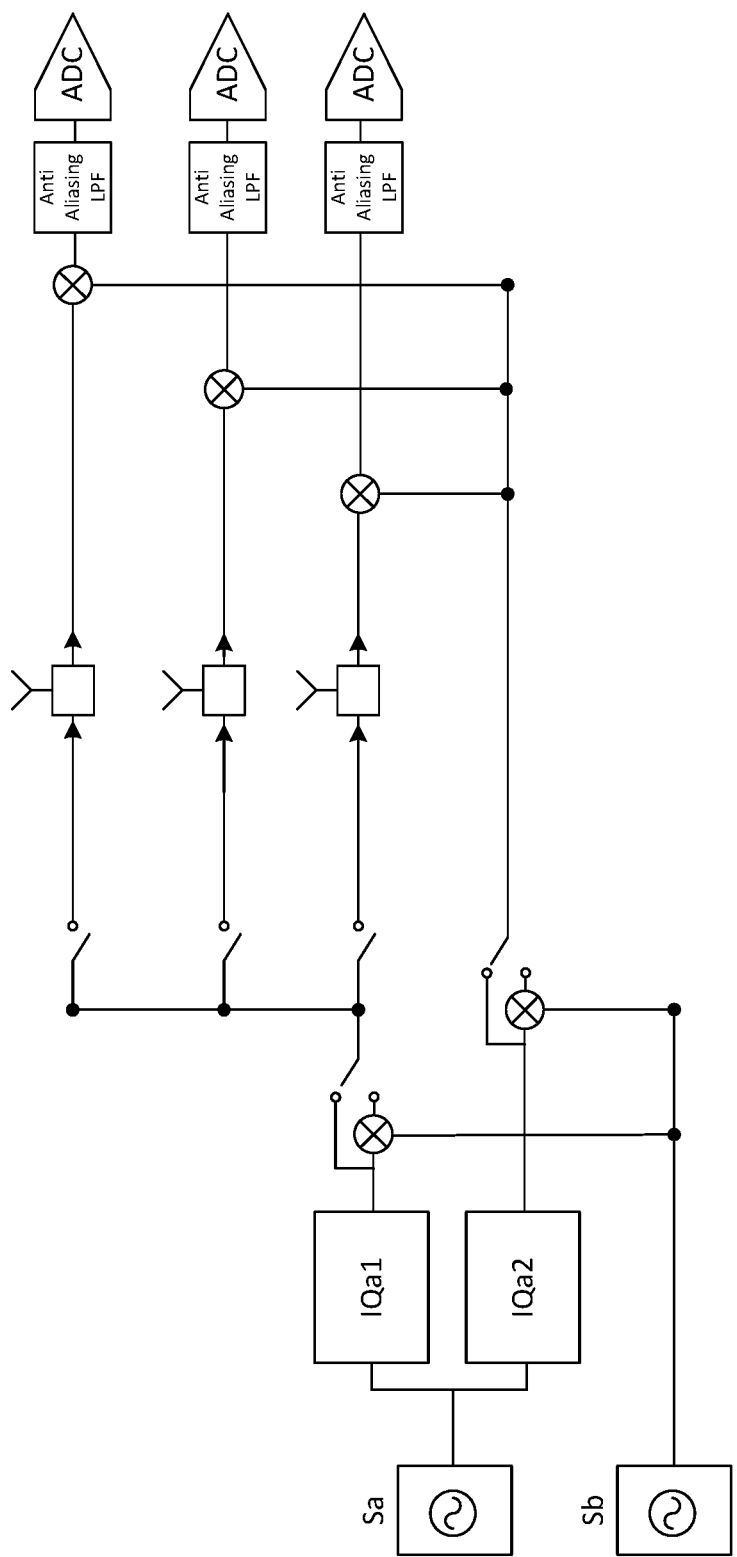
FIG. 6 illustrates a multistatic radar apparatus according to an embodiment of the present invention.

FIG. 6 illustrates a multistatic radar apparatus according to an embodiment of the present invention. In many cases it is desirable for a generated signal to be distributed among many nodes, such as transmission antennas/receivers, and so forth.

Figure 7:
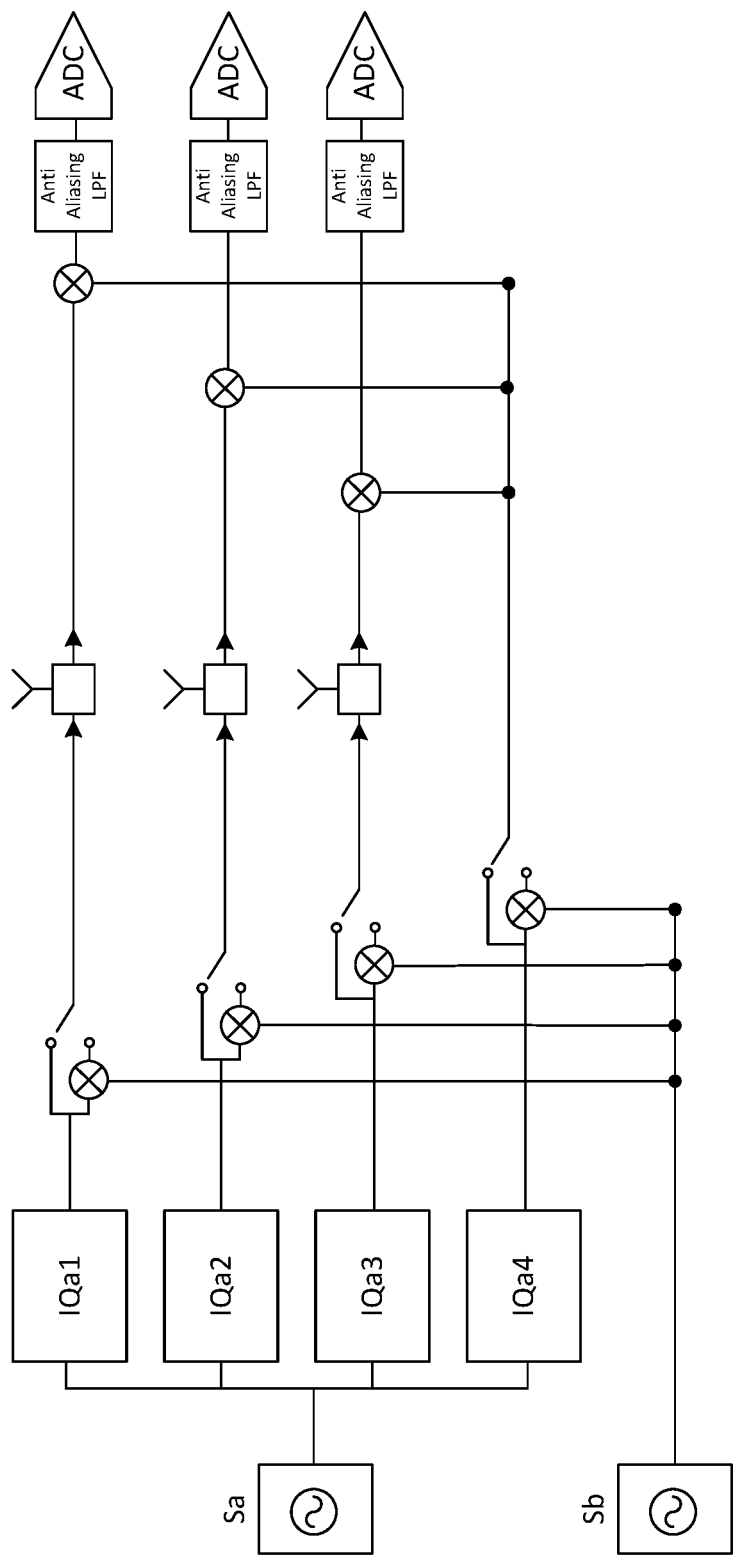
FIG. 7 illustrates a 3-channel MIMO transceiver according to an embodiment of the present invention.

FIG. 7 illustrates a 3-channel multiple input-multiple output (MIMO) transceiver according to an embodiment of the present invention. In this embodiment, the above-described coherent arbitrary modulation topology is used in conjunction with parallelism (i.e. all quadrature modulation blocks are fed by the same synthesizer and are coherent to each other). This configuration enables active beamforming such as in the context of phased-array antennas. Current implementations are usable principally in narrow-band arrays, where carrier frequencies reach the microwave regime and analog delay-induced phase shifts are used. This embodiment of the present invention provides true beam-forming by digital relative delay means. Beam-forming is achieved by baseband modulation of coherent channels relative to each other, and does not hinder the broad band nature of the transceiver array. In addition, this embodiment provides ease of implementation with digital accuracy. Steering resolution and phase coherence are very precise since the relative phase attainable at any baseband frequency is practically arbitrary, as it is limited principally by digital-to-analog converter resolution.

Calibration

Calibration plays a significant role, where quadrature modulation imbalance, local oscillator leakage and the response of the receiver and transmitter paths comprise fundamental factors in attaining the required performance of a transceiver.

Quadrature modulation imbalance and local oscillator leakage calibrations are typically performed by a minimization of mixing products after passage through a broadband envelope detector. The quadrature modulator is subjected to modulation by complex sine wave at frequency $f_{BB}$. At the output of the envelope detector, the detected power fluctuates at frequencies associated with the frequency offset between the desired signal and the spurious signals (either 2 $f_{BB}$ for the quadrature modulation image or $f_{BB}$ for the local oscillator leakage). The power fluctuations are typically measured by an analog-to-digital converter (ADC). It is important to note that if a high $f_{BB}$ is used then a high speed ADC is needed in order to capture and quantify the power fluctuations (the ADC bandwidth needs to be at least twice the baseband bandwidth in order to capture both spectral components).

Current techniques suffer from inherent difficulties associated with spurious signals and mixing products which fall on the to-be-measured quantities. As an example, mixing products from $2f_{signal}-2f_{LO}$ fall on the to-be-measured frequency associated with the quadrature modulated image: $f_{signal}-f_{image}$. Thus, the measurements are not independent. Embodiments of the invention facilitate the calibration for quadrature modulation imbalance and local oscillator leakage, without increase in architectural complexity.

The corrective action for compensation of quadrature modulation imbalance and local oscillator leakage are well known in the art. The quadrature modulation imbalance compensation involves pre-multiplying the I and Q components by a matrix of correction coefficients. The compensation of local oscillator leakage typically involves adding DC coefficients to the I and Q components. The difficult part of this procedure is determining which coefficients' values to use. This involves a feedback measurement of the strength of the image and spectral components of the local oscillator leakage.

Figure 8:
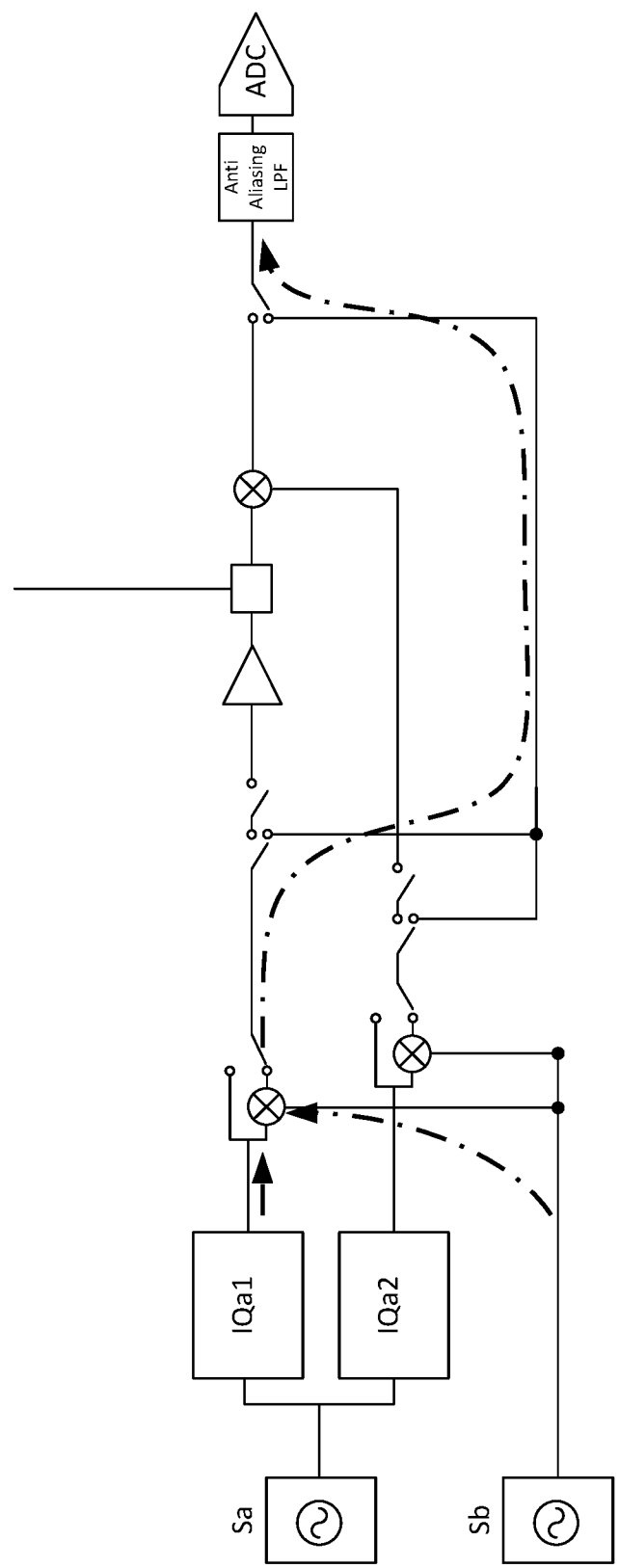
FIG. 8 illustrates a spectral component measurement arrangement at the output of the signal generation block according to an embodiment of the present invention.

FIG. 8 illustrates a spectral component measurement arrangement at the output of the signal generation block according to an embodiment of the present invention. Here, two quadrature modulation blocks are fed by a single, common, synthesizer. A method of measuring the image or local oscillator leakage is by placing the second synthesizer—used to convert the signal to the baseband—at a frequency offset relative to the spectral component of interest.

To measure the image, situated at $f_{image}=f_{Sa}-f_{IQaI}$, placing the second synthesizer at $f_{Sb}=f_{image}-f_{IF}$ which will be, after $f_{IF}$ conversion, linear in the original image magnitude. In order to reach the desired frequency at the output of the second synthesizer—driving the conversion of the output of the quadrature modulation block—fine frequency selection may be facilitated by either/or both the utilization of a fractional N synthesizer and an quadrature modulation of the synthesizer output. Only a single channel (one quadrature modulator, two synthesizers) is needed for the above scheme.

Figure 9:
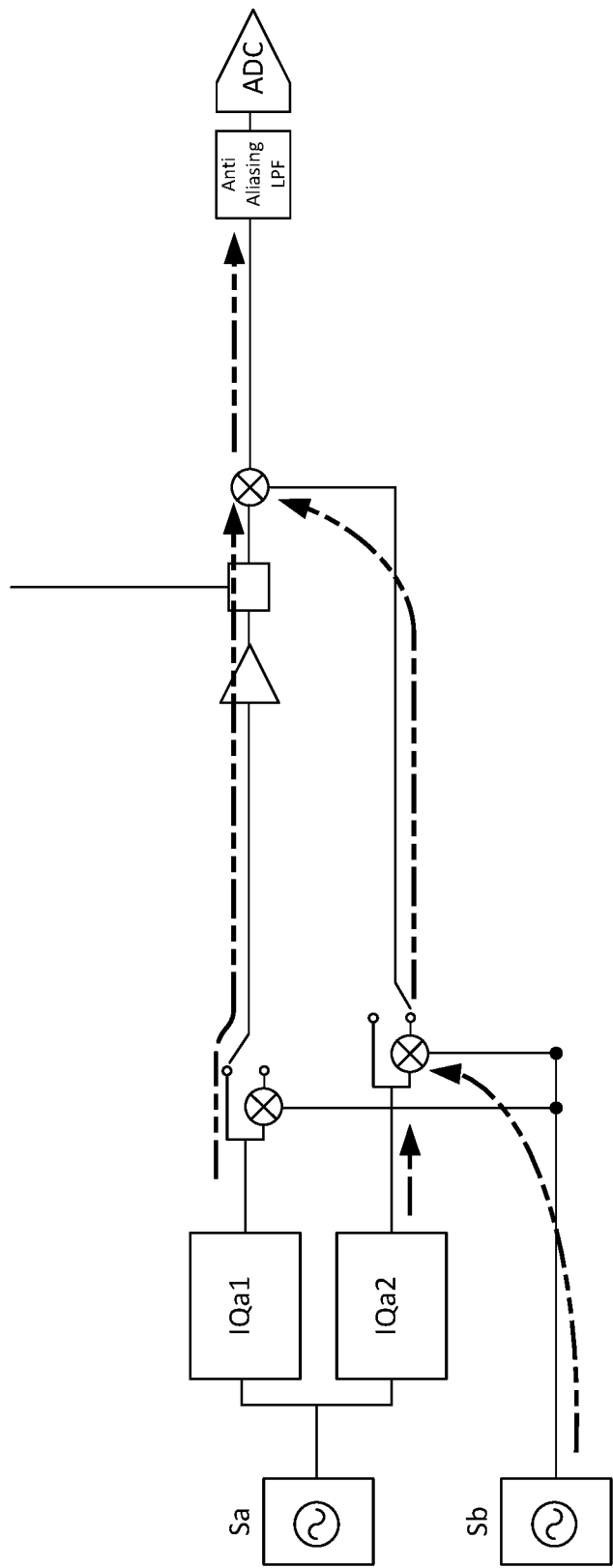
FIG. 9 illustrates a receiver-assisted spectral component measurement arrangement according to an embodiment of the present invention.

FIG. 9 illustrates a receiver-assisted spectral component measurement arrangement according to an embodiment of the present invention.

Figure 10A:
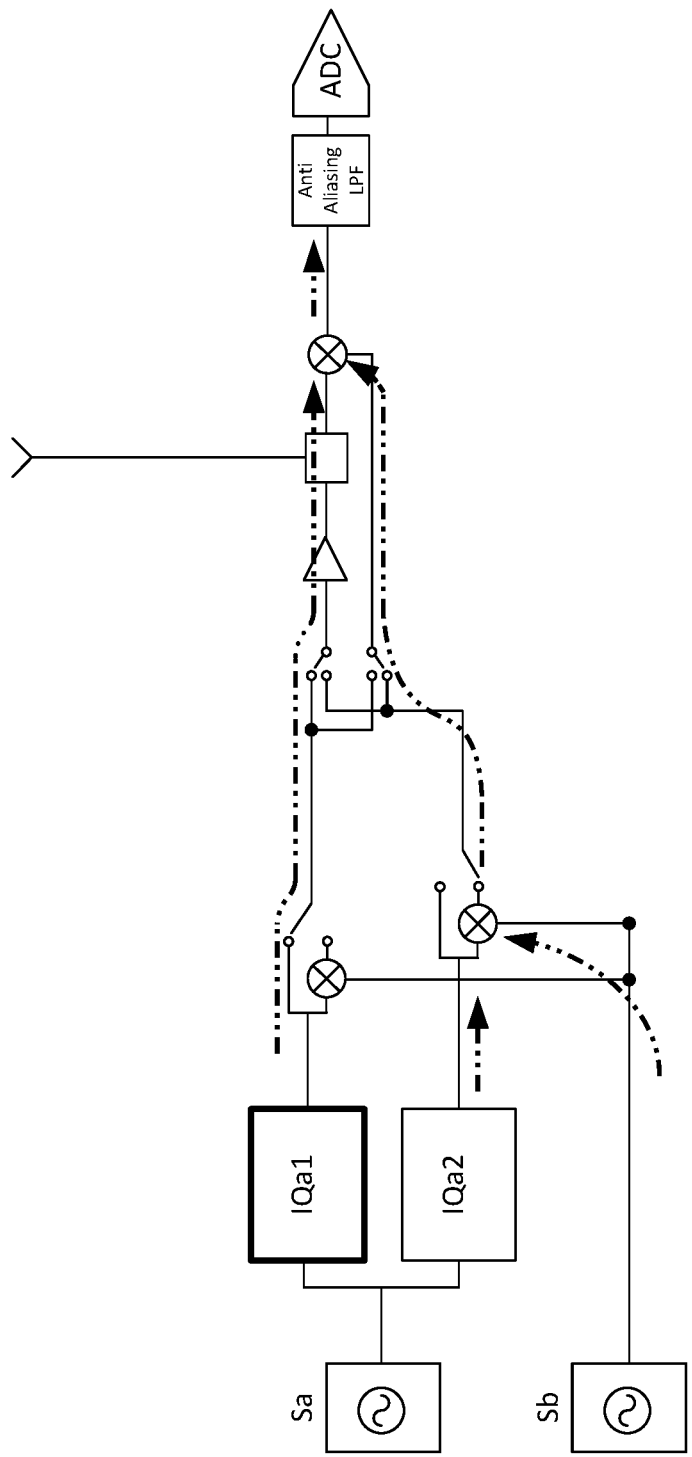
FIG. 10A illustrates a symmetrized receiver-assisted spectral component measurement arrangement for characterization of a first quadrature modulation block according to the present invention.

FIG. 10A illustrates a symmetrized receiver-assisted spectral component measurement arrangement for characterization of a first quadrature modulation block according to the present invention.

Figure 10B:
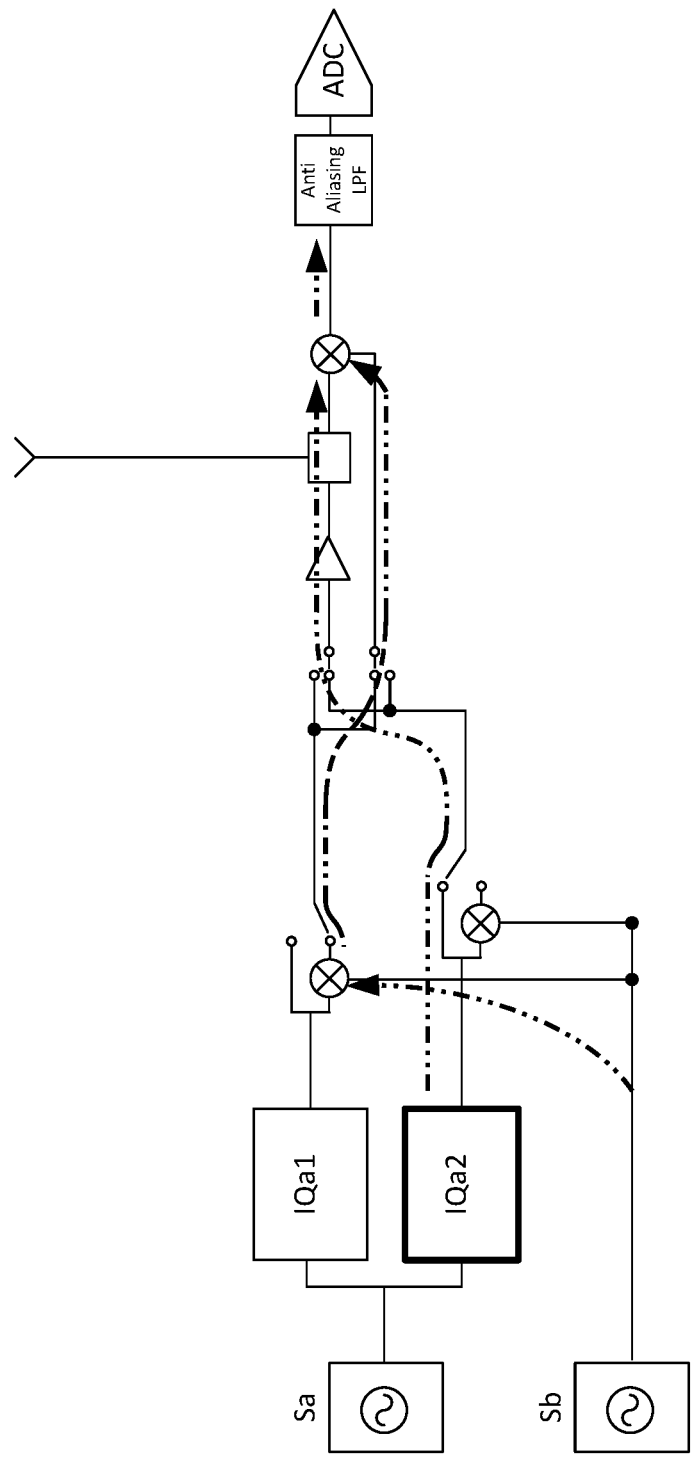
FIG. 10B illustrates a symmetrized receiver-assisted spectral component measurement arrangement for characterization of a second quadrature modulation block according to the present invention.

FIG. 10B illustrates a symmetrized receiver-assisted spectral component measurement arrangement for characterization of a second quadrature modulation block according to the present invention.

Baseband Filter Characterization

Baseband filter characteristics may vary at production. In the case of integrated circuit implementation, the filter bandwidth and shape may depend on process, temperature and voltage. The characteristics of baseband filters in the transmit and receive chains may affect system performance regarding signal-to-noise ratio, inter-symbol interference, power flatness, mask conformity, and so forth. It is thus desirable to characterize the filters and compensate for their deviation from desired characteristics. Examples of compensation include directly adjusting the filter and performing digital compensation.

The hardware architecture of embodiments of the present invention facilitates measurement of filter characteristics without further increasing complexity.

To characterize the transmit filter, the $f_{BB}$ is scanned throughout the range of interest. For each $f_{BB}$ the synthesizer's frequencies ($f_{sa}$, $f_{sb}$) are adjusted such that the resulting intermediate frequency is constant; thus avoiding the receive filter response variation (when measuring at different intermediate frequencies per $f_{BB}$).

The receiver can be tuned to a frequency corresponding to an aliased frequency $\pm f_{BB}+N \cdot f_{sample}$ (where $f_{sample}$ is the digital-to-analog converter sampling frequency). By doing so, the low pass filter in the transmit path can be characterized beyond the Nyquist frequency of the digital-to-analog converter.

Embodiments of the invention as described above and depicted in FIG. 8 and FIGS. 10A and 10B illustrate two similar schemes for scanning the baseband frequency as described above, by digitizing the output of the signal generation block.

Measuring the receiver filter is conceptually similar to the above schemes, but benefits from prior knowledge of the transmitter filter response: by knowing the response of the transmission filter, the quadrature modulation frequency can be tuned to scan the frequencies of the receiver filter. Alternatively, it is possible to measure the receiver filter separately without first characterizing the transmission filter. To do so, the quadrature modulation is held at a constant frequency (so as to not incur response variation) and the receiver frequencies are scanned by tuning the synthesizer's frequencies.

The intermediate frequency can be tuned beyond the Nyquist frequency of the analog-to-digital converter so that the receive anti-alias low-pass filter reacts to the input intermediate frequency, while the digitized output is at an aliased frequency $\pm f_{BB}+N \cdot f_{sample}$ (where $f_{sample}$ is the analog-to-digital converter sampling frequency. By doing so, the low pass filter in the receive path can be characterized beyond the Nyquist frequency of the analog-to-digital converter.

Self-Characterization of Phase Noise

Digitization of the first synthesizer, down converted by the second synthesizer, allows characterizing the relative phase noise between the two synthesizers. This measurement can be used for either self-test purposes or for performance optimizations, such as setting the phase-locked loop parameters so as to optimize the phase noise. An example of such parameter is the setting of the charge pump current in the phase detector.

Figure 11:
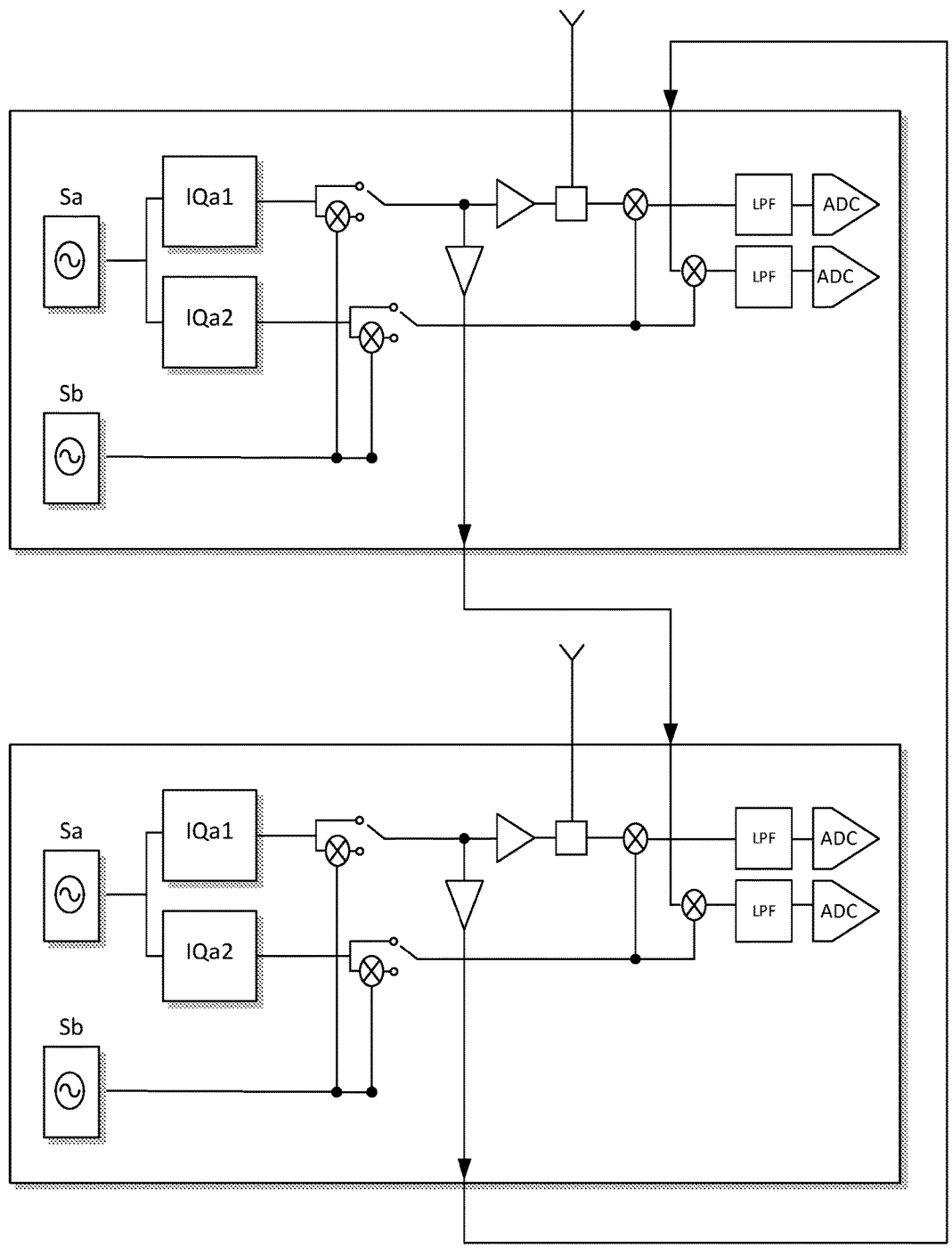
FIG. 11 illustrates a multi-module referenced based scaling arrangement according to an embodiment of the present invention.

FIG. 11 illustrates a multi-module referenced based scaling arrangement according to an embodiment of the present invention.

Figure 12:
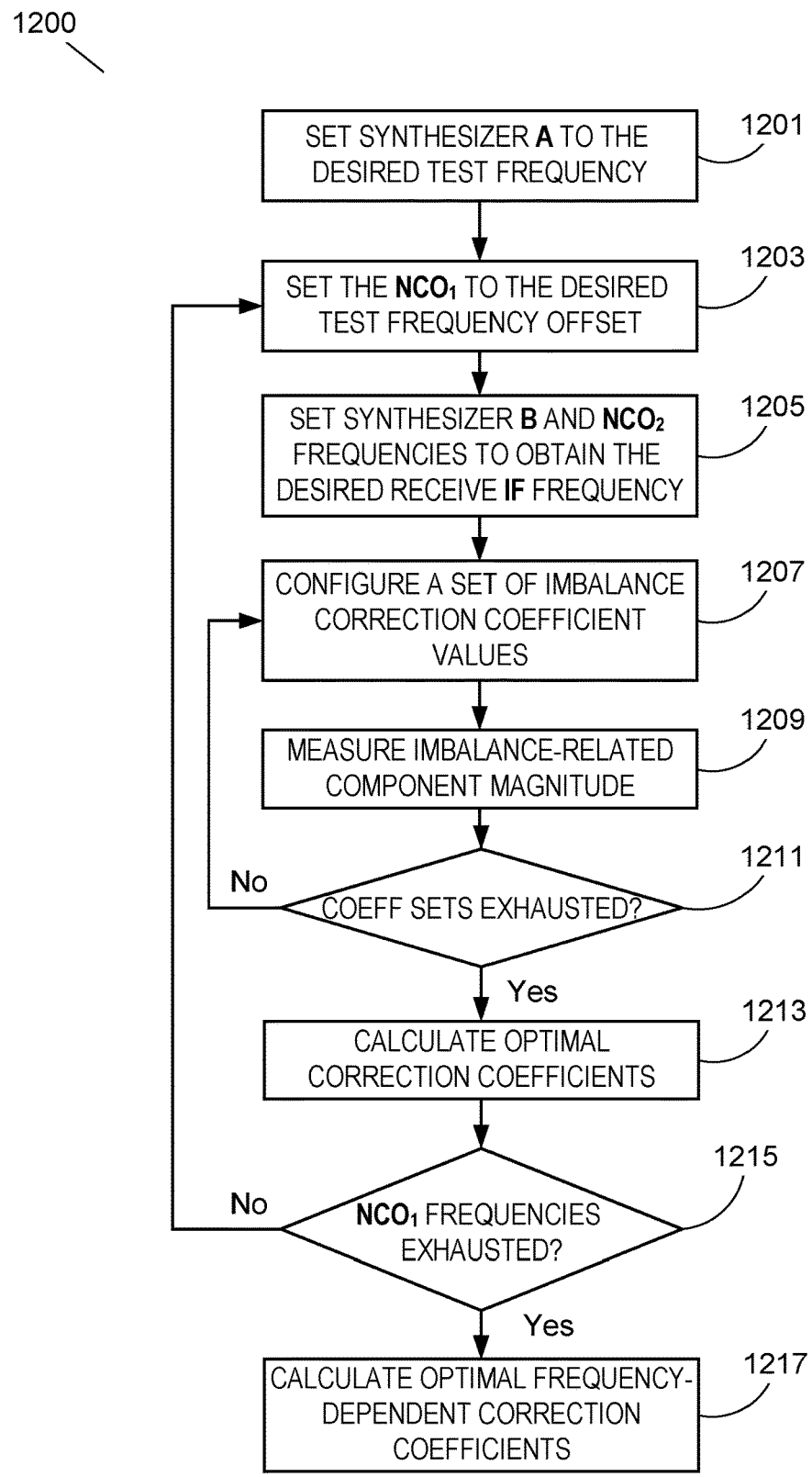
FIG. 12 is a flowchart of a method of calibrating a signal generator according to an embodiment of the present invention.

FIG. 12 is a flowchart 1200 of a method of calibrating a two-synthesizer signal generator according to an embodiment of the present invention. In a step 1201 the first frequency synthesizer is set to the desired test frequency. In a step 1203 an outer loop begins, in which the first numerically-controlled oscillator is set to the desired test frequency offset. In a step 1205, the second frequency synthesizer and the second numerically-controlled oscillator are set to obtain the desired receiving intermediate frequency.

In a step 1207 an inner loop begins for configuring a set of quadrature modulation imbalance correction coefficient values, and in a step 1209 an imbalance-related magnitude is measured. At a decision point 1211, if the coefficient set is not exhausted, the method returns to step 1207. Otherwise, if the set is exhausted, the loop beginning in step 1207 exits and the method proceeds to a step 1213, in which optimal correction coefficients are calculated.

At a decision point 1215, if the first numerically controlled oscillator frequencies are not exhausted, the method returns to step 1203. Otherwise, if the frequencies are exhausted, the loop beginning in step 1203 exits, and the method concludes with a step 1217, in which the optimal frequency-dependent correction coefficients are calculated.

What is claimed is:

1. A system for frequency-dependent characterization and compensation of a selected element of a transceiver, the system comprising:
    a first synthesizer;
    a numerically controlled oscillator (NCO);
    a pair of digital-to-analog converters (DACs) attached to the NCO, each DAC connected to a respective anti-alias filter;
    a quadrature modulator connected to the first synthesizer and to outputs of the anti-alias filters;
    a second synthesizer;
    a mixer connected to an output of the quadrature modulator and to the second synthesizer;
    a receive filter connected to an output of the mixer;
    an analog-to-digital converter (ADC) connected to an output of the receive filter; and
    a calibrator for:
        setting the first frequency synthesizer to a desired test frequency;
        setting the NCO to a desired test frequency offset;
        setting the second frequency synthesizer to obtain a desired frequency at the selected element and a desired intermediate frequency;
        processing an output of the ADC to measure at least one of an amplitude and a phase at the desired intermediate frequency;
        calculating a frequency-dependent correction coefficient for the selected element; and
        applying a compensation based on the frequency-dependent correction coefficient for a response of the selected element.

2. The system of claim 1, wherein the system characterizes a plurality of digital inputs to the first pair of DACs and a configuration of the second synthesizer.

3. The system of claim 1, wherein the selected element is an anti-alias filter.

4. The system of claim 1, wherein the selected element is the receive filter.

5. The system of claim 1, wherein the selected element is the quadrature modulator.

6. The system of claim 1, wherein the digital inputs to the first pair of DACs and the configuration of the second synthesizer are selected so as to obtain a plurality of characterizations.

7. The system of claim 1, wherein the digital inputs to the first pair of DACs and the configuration of the second synthesizer are selected so as to apply a plurality of compensations.

8. The system of claim 1, wherein the compensation is applied by tuning the element.

9. The system of claim 1, wherein the compensation is applied by means of digital compensation.

10. The system of claim 3, wherein the characterization and compensation for an anti-alias filter are beyond a Nyquist frequency of a DAC.

11. The system of claim 4, wherein the characterization and compensation for the receive filter are beyond a Nyquist frequency of the ADC.

* * * * *